(12) United States Patent
Hsieh

(10) Patent No.: US 8,081,735 B1
(45) Date of Patent: Dec. 20, 2011

(54) PSTN VOIP RECONCILIATION

(76) Inventor: Mingchih Hsieh, Saratoga, CA (US)

( * ) Notice: Subject to any disclaimer, the term of this patent is extended or adjusted under 35 U.S.C. 154(b) by 889 days.

(21) Appl. No.: 12/080,316

(22) Filed: Apr. 1, 2008

(51) Int. Cl.
*H04M 1/24* (2006.01)

(52) U.S. Cl. ............... 379/22.03; 379/14.01; 379/1.04; 370/352

(58) Field of Classification Search .............. 379/1.01, 379/1.03, 1.04, 14, 14.01, 10.01, 9, 22, 15.05, 379/15.04, 15.01, 22.02, 22.03; 370/352
See application file for complete search history.

(56) References Cited

U.S. PATENT DOCUMENTS

| | | | |
|---|---|---|---|
| 7,003,098 B2 * | 2/2006 | Smith | 379/406.02 |
| 7,460,467 B1 * | 12/2008 | Corcoran | 370/208 |
| 2008/0008162 A1 * | 1/2008 | Martinez et al. | 370/352 |

* cited by examiner

*Primary Examiner* — Olisa Anwah
(74) *Attorney, Agent, or Firm* — Robert Samuel Smith

(57) ABSTRACT

A method for determining if a which node through which a signal is propagated i (e.g., PSTN or VOIP) when the distances from the source to VOIP modem and PSTN connections are both known, the steps making a measurement that indicates a distance that a signal travels from a source to a point of reflection (e.g., a PSTN or VOIP connection) and comparing the measurement to known values corresponding to the distances from the source to closest VOIP and PSTN nodes.

5 Claims, 3 Drawing Sheets

PSTN VOIP RECONCILIATION

FIELD OF THE INVENTION

This invention relates to VOIP PSTN technology and particularly to a device and method for overcoming inadequate performance of telephone communications of systems that communicate through PSTN and INTERNET technology.

BACKGROUND AND INFORMATION DISCLOSURE

The earliest communication system by telephone was the Public Switched Telephone Network (PSTN) in which the telephones of two parties were connected by copper wire through switches controlled by a central office.

Although this network was created using analog voice connections through manual switches, automated telephone exchanges replaced most switchboards. Most switches now use digital circuits between exchanges, with analog two-wire circuits still used to connect to most telephones.

Voice over IP (VoIP) technology allows telephone calls to be made over computer networks like the Internet. VoIP converts analog voice signals into digital data packets and supports real-time, two-way transmission of conversations using Internet Protocol (IP).

Providers of VoIP, offer a variety of services. The most common application of VoIP for personal or home use is internet-based phone services that rely on a telephone switch. With this application, you will still have a phone number, will still dial phone numbers, and will likely have an adapter that allows you to use a regular telephone. The person you are calling will not likely notice a difference from a traditional phone call.

VoIP phone service for consumers and small businesses typically runs over broadband equipment Internet or similar broadband connection. The problem is that VOIP may delay data transmission and cause voice jitter This causes malfunction of the modem.

Although the PSTN system was initially the only system in use, the volume of Voice over IP usage has grown dramatically in recent years. Many customers subscribe for service from both a provider and a central office. The typical situation is where a customer initiating or receiving a call does not know whether an incoming call is from VoIP or from PSTN. Therefore when his phone service has a problem such as jitter, he is uncertain as to whether the problem originates between his phone and the central office of PSTN or with a provider of Voice over IP protocol.

SUMMARY OF THE INVENTION

It is an object of this invention to enable a customer to identify what line is being used when he has a problem initiating or receiving a phone call. The call may be coming through the Internet or through the central office of the PSTN. The customer can then notify the central office that he has a problem and what line he is using. This will enable the central Office to take corrective action such as using a different algorithm to transmit the signal or reducing speed of transmission.

It is an object, to enable the user of a phone call to determine if a call is over the INTERNET or through the central office of PSTN.

The typical central office of the PSTN is located several miles from the customer. Any message or signal transmitted between the central office to the customer's phone is subject to a delay dependent on the length and characteristic impedance of the copper wire.

The typical connection between the customer's phone to the broadband connection is located at a shorter distance than the distance to PSTN. Any message or signal transmitted between the broadband connection and the customer's phone is subject to a delay dependent on the distance and characteristic impedance of the customer's line.

This invention is directed toward a device for measuring the distance traveled by a signal from a customer's computer or phone to the first point of reflection of the signal. The point of reflection is the customer's connection to either the PSTN exchange or the connection to the INTERNET. The device measures the transmission period beginning when the signal is generated at the customer's computer and is echoed back to the customer's computer from the point of reflection. The length of this transmission period is applied to computing the distance and therefore the source (connection to PSTN or Internet) of the echo.

According to an additional embodiment of the invention, a programmable impedance is connected to the line adjacent to the customer's phone (or computer) which is selected to reinforce reception of the echo. This facilitates measurement of the period between start of the signal and reception of the echo.

DISCUSSION OF THE DRAWINGS

Figure 1:
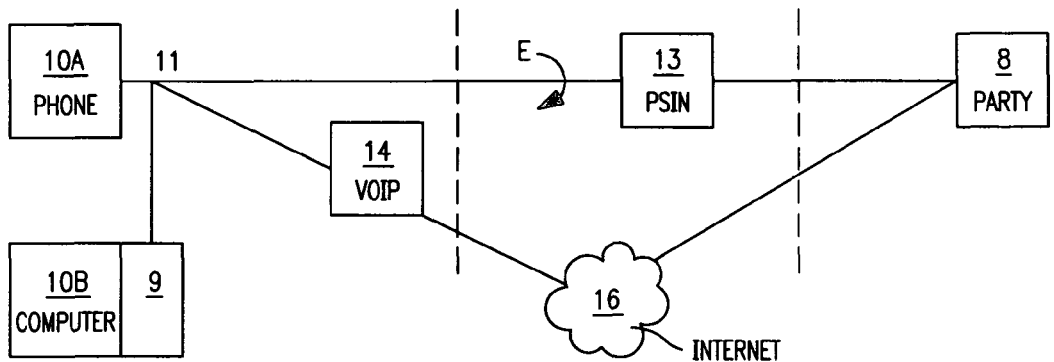
FIG. 1 (prior art) shows the arrangement of present typical system for transmitting a signal between two communication nodes.

Turning now to a discussion of the drawings, FIG. 1 (prior art) shows the arrangement of a present typical system for transmitting a signal through either one of two communication nodes.

There are shown the "customer" who is either sending or receiving a signal using either a phone 10A, a computer 10B to or from another party 8, If the customer originates or receives the signal by phone, the signal is an analogue signal that is transmitted through wires to or from either the PSTN 13 or a VOIP node 14 connected to the internet 16. The VOIP node is typically proximal to the customer.

If the message originates the signal by a computer 10B, the signal is converted by a modem 9 (located with the computer 10B) to an analogue signal. The analogue signal is transmitted to either the PSTN exchange 13 or a VOIP modem 14 connected to the internet 16.

In either case, for any one of several reasons the signal sometimes becomes garbled and the customer wants to know if the signal was sent or received through the PSTN or over the Internet. The customer wants to find out the route of the signal (Internet or PSTN) as a first step in correcting the problem.

Figure 2:
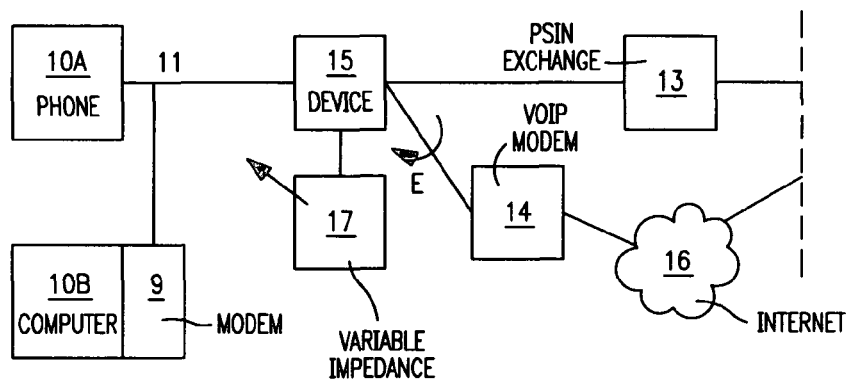
FIG. 2 is a schematic diagram of the invention which shows the system of FIG. 1 with the addition of details of the means 14 for measuring the transmission period, T, equal to the time difference between generation of the signal and reception of the echo

FIG. 2 shows the principle of the invention for determining the path of the signal. There is shown a device 15 of this invention connected in-line adjacent to the customer's station 10 which sends out a test signal. The customer receives an echo E at a later instant generated by the test signal. The echo is a reflection of the test signal at either the PSTN or VOIP connection. The period between the start of the test signal and the reception of the echo at device location 15 is a measure of the distance from the customers phone or computer to the PSTN or Internet VOIP connection. The customer interprets the distance (delay between echo and signal) to determine if the signal pathway is through PSTN or through the Internet.

FIG. 2 also shows a variable impedance 17 which is adjusted to maximize the intensity of the echo signal.

Figure 3:
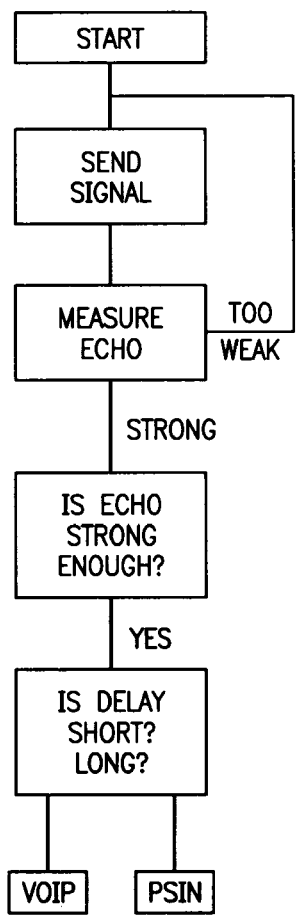
FIG. 3 is a flow chart of steps of the method for determining if a signal generated from a source is transmitted to a receiver through a node being a PSTN connection or a VOIP connection when the distances from the source to VOIP modem and PSTN connections are both known

FIG. 3 is a flow chart of steps of the method of the invention for determining if a signal generated from a source is transmitted to a receiver through a node that is distant (being the usual situation for a PSTN connection) or close by (being the usual situation for a VOIP connection).

In step 1, a test pulse/signal is generated by the customer.

In step 2 the signal is pulse/sent to first node which is either the connection to PSTN or the VOIP.

In step 3 the strength of the echo is measured by the customer.

In step 3A, if the echo is not sufficiently strong the customer adjusts the variable impedance and goes back to step 2

In step 3B, if the echo of the pulse/signal is sufficiently strong, then the customer examines the delay time and reaches a decision based on the delay time as to whether the first node is a PSTN connection or Internet connection.

Figure 4:
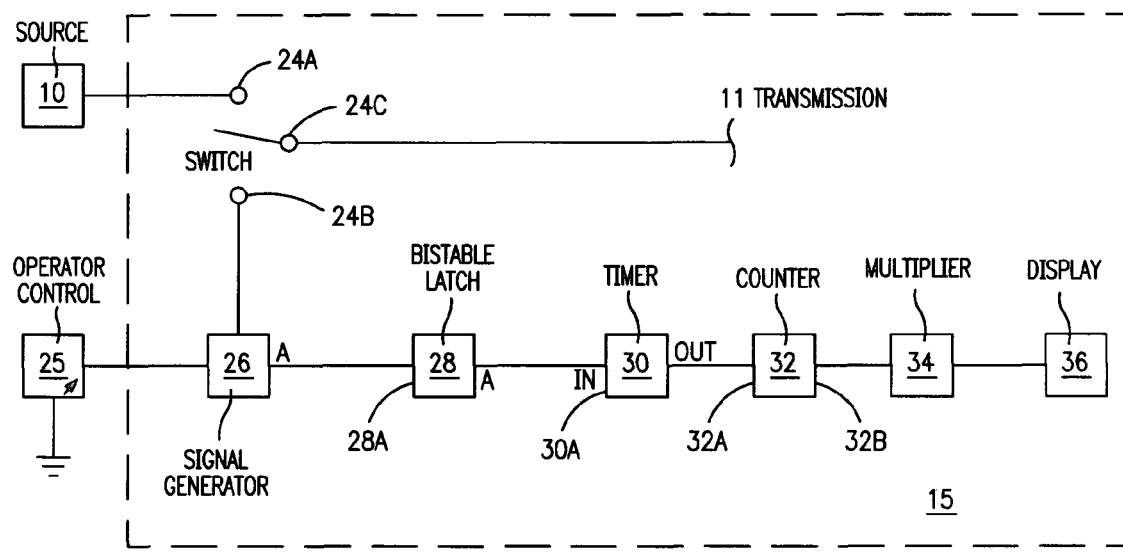
FIG. 4 shows one version of the means 14 for measuring trans-mission time, T, computing and displaying the distance D.

FIG. 4 shows one version of the means 15 for measuring transmission period, T, computing and displaying a number, N, representing the distance D.

There is shown a switch 24 having a common terminal 24C connected to a transmission line 11 whose other end (not shown) is connected to node 12A or 12B;

a first terminal 24A of the switch 24 Is connected to the source 10;

a pulse/signal generator 26 for generating at least one discrete pulse under control of the operator and whose output terminal 26A is connected to a second terminal 24B of said switch 24;

a bistable latch 28 having an input terminal 28A (set/reset terminal) connected to a second terminal 24B of switch 24;

a timer 30 having an input terminal 30A connected to an output terminal of the latch 28 wherein the timer increments by one during a timer period t; that the latch 28 is high.

a counter 32 having an input terminal 32A connected to an output terminal of said timer 30 and an output terminal 32B arranged to output a number N of counts N from timer 30;

a multiplier 34 arranged to compute a value of distance, D=2C N t being the distance between the source and the node where C is a velocity of the signal transmitted to the node and t is a period between successive counts of said counter; (The node is a point of reflection of the signal.)

a display means 36 for displaying the value D:

The calculation of D is optional since the number of counts N may be relied on to judge the distance between source and node and decide whether the reflecting node is relative close to or far from the source.

There has been described an invention that meets the objects of the invention whose objective is to determine if the closest receiving node of a signal transmitted from a source is VOIP or PSTN.

An arrangement has been described for practicing the method. Other arrangements or modifications may be contemplated after reading the specification and studying the invention which are within the scope of the invention.

For example, FIG. 2 also shows the inclusion at the source 10 of a variable matching impedance 25 that is adjusted to match impedance between the node and input to the "means for measuring transmission period" in order to increase the strength of the echo signal.

Other variations for measuring the period such as differences in method for displaying the period may be contemplated according to various embodiments.

I therefore wish to define my invention by the appended claims

What is claimed is:

1. A method for determining if a node through which a signal to or from a source is transmitted is either one of a first node connected to a first transmission line or a second node connected to a second transmission line when the transmission periods through said first and second transmission lines to or from the source to from or to said respective nodes are known relative to one another, said steps including:

A.) provide a means for measuring a reflected transmission period being the period from the start of an original signal from said source to the instant of reception at the source of an echo of the original signal reflected from a node;

B.) connect the means of step A) between the source and one end of the transmission line opposite said node;

C.) generate a test signal from the source permitting said test signal to be reflected from said node;

D.) apply said means of step A to measure a reflected transmission period of said test signal;

E.) compare said transmission period to said known transmission periods thereby leading to a conclusion as to which transmission line of first or second lines, said test signal was transmitted.

2. The method of claim 1 wherein said means for measuring the transmission period, includes:

a switch having a common terminal connectable to one end of a transmission line whose other end of said transmission line is connected to a node;

a first terminal of said switch connectable to said source;

a pulse/signal generator for generating at least one discrete pulse/signal under control of the operator and whose output is connected to a second terminal of said switch;

a bistable latch having an input terminal connected to a second terminal of said switch;

a timer having an input terminal connected to an output terminal of said latch wherein said timer generates an output counter signal, N, that increments by one during each timer period, t, of a succession of timer periods during a pulse travel period, said pulse travel period beginning when a pulse from said pulse generator is received by said latch and ending when an echo pulse is received by said latch;

a display means connected to said timer for displaying the value N:

wherein said step D of claim 1 includes the step:

connecting said common terminal to said second terminal providing that said source is disconnected from said line and said line is connected through said switch to an output terminal of said pulse generator and to an input terminal of said latch;

generating a pulse from said pulse generator which is received by said latch to start a count period, said pulse also travelling to said node in said line that generates an echo providing that said echo returns to said input to said latch and ends said count period whereby said timer counts a number of counts indicating length of said count period;

transmission line to known lengths of a line connected to said VOIP node and a line connected to said PSTN node.

3. The method of claim 1 wherein said first node is a VOIP node and said second node is a PSTN node.

4. The method of claim 1 wherein a variable matching impedance is connected between said common terminal and ground and an additional step after said step D includes:

adjusting said variable matching impedance to where said echo signal is maximized.

5. The method of claim 1 wherein said first node is a PSTN node and said second node is a VOIP node.

* * * * *